United States Patent
Plessing

(10) Patent No.: US 9,346,142 B2
(45) Date of Patent: May 24, 2016

(54) TOOL ARRANGEMENT

(71) Applicant: Liebherr-Verzahntechnik GmbH, Kempten (DE)

(72) Inventor: Matthias Plessing, Kempten (DE)

(73) Assignee: Liebherr-Verzahntechnik GmbH, Kempten (DE)

( * ) Notice: Subject to any disclaimer, the term of this patent is extended or adjusted under 35 U.S.C. 154(b) by 0 days.

(21) Appl. No.: 13/968,966

(22) Filed: Aug. 16, 2013

(65) Prior Publication Data

US 2014/0051339 A1 Feb. 20, 2014

(30) Foreign Application Priority Data

Aug. 20, 2012 (DE) .......................... 10 2012 016 514
Sep. 17, 2012 (DE) .......................... 10 2012 018 358

(51) Int. Cl.
  *B23Q 3/12* (2006.01)
  *B23F 23/12* (2006.01)

(52) U.S. Cl.
  CPC .............. *B23Q 3/12* (2013.01); *B23F 23/1237* (2013.01)

(58) Field of Classification Search
  CPC ........................ B23Q 3/12; B23Q 3/14; B23F 23/1237–23/1287
  USPC ........................... 451/294, 344–360, 540–558
  See application file for complete search history.

(56) References Cited

U.S. PATENT DOCUMENTS

| | | | | |
|---|---|---|---|---|
| 791,159 | A * | 5/1905 | Norton | 451/342 |
| 1,719,941 | A * | 7/1929 | Mogford | 384/474 |
| 3,566,547 | A * | 3/1971 | Lonaberger et al. | 451/342 |
| 4,109,549 | A * | 8/1978 | Vincent | 416/144 |
| 4,180,946 | A * | 1/1980 | Heijkenskjold et al. | 451/24 |
| 4,519,621 | A * | 5/1985 | Okamoto | 279/116 |
| 4,566,226 | A * | 1/1986 | Kimura | 451/5 |
| 4,620,824 | A * | 11/1986 | Eckstein et al. | 409/233 |
| 4,637,170 | A * | 1/1987 | Block | 451/342 |
| 4,729,193 | A * | 3/1988 | Gant et al. | 451/342 |
| 5,443,413 | A * | 8/1995 | Pflager et al. | 451/11 |
| 2003/0228831 | A1* | 12/2003 | Hsiao | 451/294 |
| 2004/0219869 | A1* | 11/2004 | MacKay | 451/359 |
| 2010/0015897 | A1* | 1/2010 | Moeller | 451/294 |
| 2011/0052342 | A1* | 3/2011 | Hongou | 409/231 |
| 2012/0282056 | A1* | 11/2012 | Zindl | 409/232 |
| 2014/0051339 | A1 | 2/2014 | Plessing | |

FOREIGN PATENT DOCUMENTS

| | | |
|---|---|---|
| DE | 30 44 707 A1 | 6/1982 |
| DE | 195 48 142 A1 | 6/1997 |
| DE | 100 37 201 A1 | 2/2001 |
| DE | 103 00 404 A1 | 8/2003 |
| EP | 2 700 466 A2 | 2/2014 |

* cited by examiner

*Primary Examiner* — Lee D Wilson
*Assistant Examiner* — Henry Hong
(74) *Attorney, Agent, or Firm* — Crowell & Moring LLP

(57) ABSTRACT

A tool arrangement for a rotary machining tool, for example a grinding disk, has a spindle rotatably accommodated in a housing via a bearing set, onto which spindle a tool holder including a tool mandrel can be clamped for fixing the tool. The tool holder with the tool can be clamped onto the spindle such that the at least one front bearing of the bearing set as well as the set center of the bearing set are enclosed by the tool mandrel and/or the tool.

20 Claims, 3 Drawing Sheets

PRIOR ART

TOOL ARRANGEMENT

This application claims priority to German Patent Application 10 2012 016 514.5, filed Aug. 20, 2012, the entire disclosure of which is incorporated herein by reference, and to German Patent Application 10 2012 018 358.5, filed Sep. 17, 2012, the entire disclosure of which is also incorporated herein by reference.

BACKGROUND OF THE INVENTION

1. Field of the Invention

The present invention relates to a tool arrangement for a rotary machining tool, and to a machining center with such a tool arrangement.

2. Description of Related Art

Tool arrangements for rotary machining tools, such as generating and profile grinding machines, for fixing a tool, in particular a grinding disk, are known from the prior art. In these generating and profile grinding machines one difficulty consists in that due to the occurring machining forces deformations are obtained at the tool holder, which are transmitted to other machine parts and to the housing of the machines.

Conventionally, the tool is clamped onto a mandrel which in turn is put onto the tool spindle via a steep cone chuck, braced and thereby driven. There occur imbalances and with long superstructures also wobbling effects. At the same time, the rigidity decreases with the length of the arrangement.

To compensate the undesired effects explained above, a counter bearing is required with increasing width of the tools. With narrower tools, a counter bearing can be omitted, as in general the tool mandrel and the spindle shaft are designed in one piece and the tool is arranged close to the spindle bearing.

The spindle generally is driven by an integrated motor or by a belt. The bearings, for example high-precision ball bearings, must be designed such that a sufficient rigidity of the connection, in particular also at high speeds, can be made possible. The bearings required for this purpose mostly are designed as anti-friction bearings and are available in different designs, such as e.g. single-row universal bearings. To increase the rigidities, the bearings are arranged or paired and biased in different ways, for example in an O-arrangement, an X-arrangement, a tandem -O- or a tandem -X- arrangement. In a spindle set-up, the arrangement of the bearings varies very much and depends on the respective conditions of use.

Mounting the tool on the spindle generally is effected by means of a tool mandrel. The tool mandrel frequently is braced with the spindle by means of a hollow shank cone and a clamping cartridge. In general, the hollow shank cone is seated in the tool holder, and the hollow shank cone receptacle including the clamping cartridge is seated in the spindle.

SUMMARY OF THE INVENTION

It is one object of the present invention to provide a tool arrangement for a rotary machining tool, by which on the one hand a stable and rigid arrangement of the tool can be realized and on the other hand a quick, flexible and comfortable tool change becomes possible.

According to the invention, this object is solved by a tool arrangement as claimed, and by a machining center as claimed.

The tool arrangement for a rotary machining tool according to the invention, in particular for a hard-fine gear grinding machine for gear grinding, includes a spindle rotatably accommodated in a housing via a bearing set, onto which spindle a tool holder comprising a tool mandrel can be clamped for fixing the tool. According to the inventive solution, the tool holder with the clamped tool is fixed on the spindle such that the at least one front bearing of the bearing set as well as the set center of the bearing set are enclosed by the tool mandrel and/or by the tool. The bearing set consisting of at least one bearing pair almost completely is arranged under the tool mandrel and/or the tool. Thus, a high rigidity is achieved, so that even with broader tools a counter-bracket can be omitted.

The inventive arrangement of the spindle bearings under the tool leads to a more compact and shortened construction of the tool arrangement, whereby machining of more complicated workpieces becomes possible and interfering contours are reduced. Furthermore, due to the cantilevered support also of broader tools a considerable cost reduction is achieved as compared to conventional arrangements with counter bearing.

Preferably, the spindle of the tool arrangement according to the invention is supported in the housing by means of at least one bearing pair, wherein particularly preferably at least one front bearing of the bearing pair of the bearing set is arranged completely under the tool mandrel and/or under the tool. The bearings of the spindle bearing are conceivable in all positions on their horizontal axis.

The bearing set, consisting of at least one bearing pair, preferably can consist of anti-friction bearings, in particular of spindle bearings. In principle, however, all possibilities of the bearing arrangements known from the prior art are conceivable and possible in accordance with the invention.

The bearing set for example also can consist of magnetic bearings, hydrodynamic bearings, hydrostatic bearings, aerostatic bearings or aerodynamic bearings.

It is regarded as particularly preferred when the tool holder of the tool arrangement according to the invention includes a tool mandrel, a clamping cartridge, in particular a hollow shank cone clamping cartridge and a clamping lid. The tool mandrel is formed such that it is releasably connectable with the spindle and includes a holder for the tool, so that the tool can be mounted on the tool mandrel. The clamping lid is used to fix the tool on the tool mandrel.

Preferably, the hollow shank cone clamping cartridge can be part of the tool holder and be arranged between the spindle and the tool mandrel. Alternatively, the clamping cartridge can be part of the spindle. The hollow shank cone clamping cartridge and the hollow shank cone receptacle are arranged in the mandrel, the hollow shank cone in the spindle. The hollow shank cone clamping cartridge is manually actuated axially, in order to clamp the tool mandrel onto the spindle. An inverted automatic hollow shank cone clamping cartridge and a short cone receptacle with screws and a cylindrical receptacle with screws or a steep cone receptacle likewise are possible and can easily be realized. With all these constructions a high rigidity is achieved without counter bearing. A fast and simple tool change thus can be realized by the change of the tool mandrel including the clamped tool.

The spindle preferably is formed such that it includes a hollow shank cone or alternatively a hollow shank cone receptacle.

A particularly advantageous embodiment of the tool arrangement according to the invention provides that a balancing element (also called balancing head), which serves for compensating imbalances during the rotation of the tool arrangement, is at least almost completely accommodated in the spindle, so that the balancing element is surrounded by the tool. By this solution it is achieved that with changing tools and a plurality of tool mandrels only one balancing element is required. Here, an automatic balancing takes place.

In addition to the integrated balancing element one or two manual balancing rings can be arranged on both sides of the grinding disk.

It is, however, also conceivable that the balancing element integrated in the spindle is formed as ring and therefore the hollow shank cone clamping cartridge is arranged in the free space in a commonly used design.

The above object according to the invention also is solved by a hard-fine gear grinding machine and in particular a generating and profile grinding machine as claimed.

BRIEF DESCRIPTION OF THE DRAWINGS

The present invention will now be explained in detail with reference to exemplary embodiments illustrated in the drawings.

DETAILED DESCRIPTION OF THE INVENTION

Figure 1:
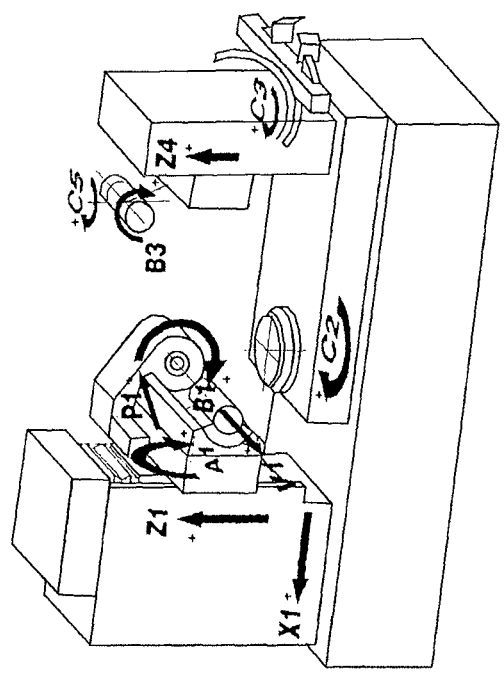
FIG. 1 shows a simplified schematic representation of a generating and profile grinding machine according to the prior art.

FIG. 1 shows a simplified schematic representation of a generating and profile grinding machine according to the prior art. This machine has a known construction and will therefore not be explained in detail. In the schematic perspective representation of the generating and profile grinding machine for generating or profile grinding the different directions of movement are shown. The representation shows the six standard axes of this machine, which can be divided into the three linear axes X1, Z1, V1 and the three axes of rotation A1, B1 and C2. The axis of rotation A1 serves for swiveling the tool in, the axis of rotation B1 is responsible for the rotary movement of the tool used, and the axis of rotation C2 designates the rotary movement of the non-illustrated workpiece to be machined, which is located on the tool table. The three linear axes X1, Z1 and V1 serve for the radial movement each of the tool (X1), for the feed movement of the tool (Z1) and for the tangential movement of the tool (V1).

The cutting speed with which a clamped workpiece is machined on the workpiece table can be determined by the speed of rotation about the axis of rotation B1. The speed of rotation of the tool about the axis of rotation B1 is modulated, in that a modulating additional movement is superimposed on the same. The corresponding actuation of the linear and rotational axes of the machine is performed by a known CNC controller. The C5-axis shows the swiveling of the dressing spindle, and the C3-axis shows the rotation of the annular bearing. The counter-bracket arm movement is designated by the Z4-axis, and B3 is the tool axis.

Figure 2:
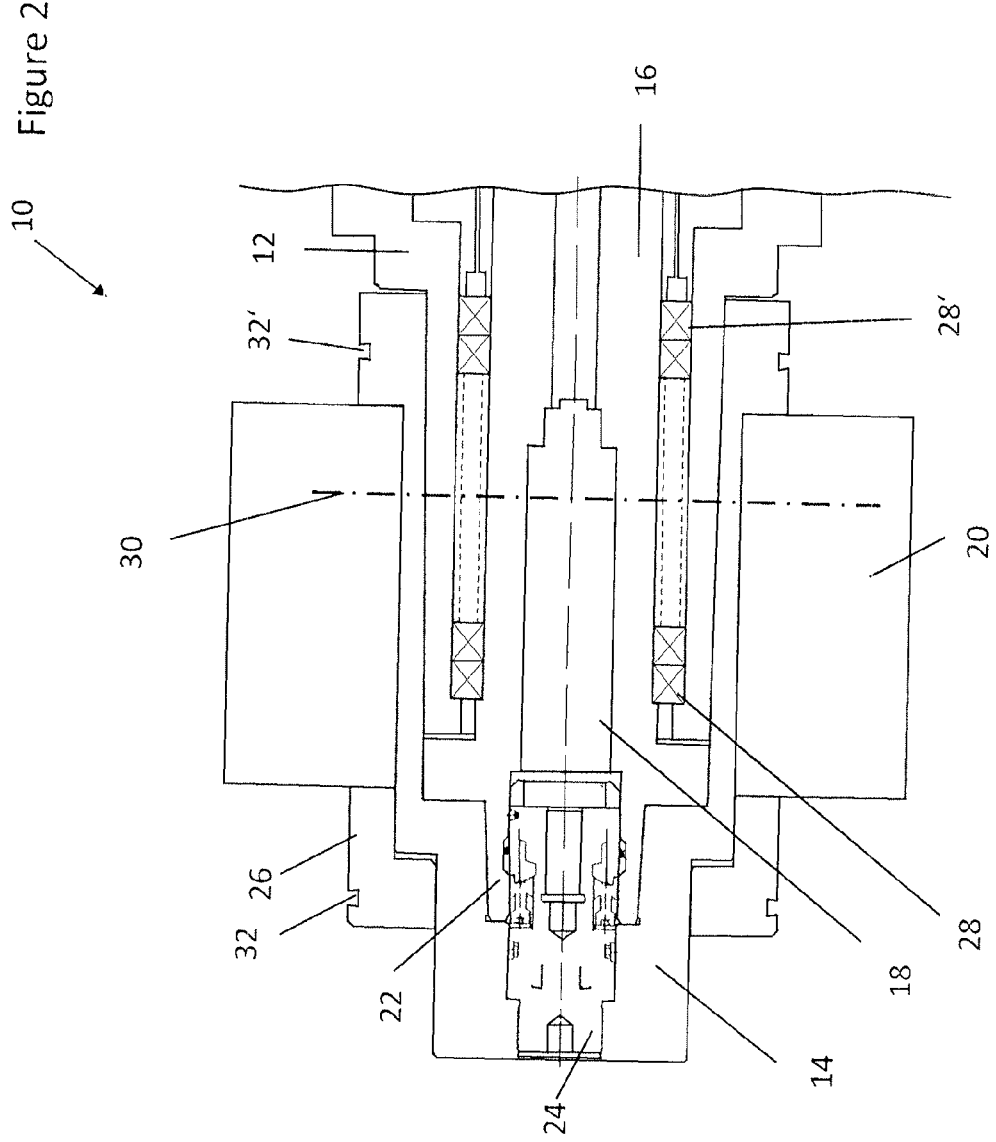
FIG. 2 shows a partial sectional representation of a tool arrangement according to the invention of a generating and profile grinding machine according to a preferred exemplary embodiment.

FIG. 2 shows a partial sectional representation of a tool arrangement 10 according to the invention in the region of the tool holder. The tool arrangement 10 includes a housing 12 which is connected with a tool mandrel 14 and in which a spindle 16 is mounted. Between the housing 12 and the spindle 16 the bearing set 28 and 28' is arranged. In this exemplary embodiment, the bearing set 28, 28' includes two bearing pairs which in the housing 12 are mounted on the spindle 16, wherein the front bearings of the bearing set 28 and the set center (30) of the bearing set are arranged inside the spindle housing 12 and at the same time inside the tool mandrel 14.

The rear bearings of the bearing set 28' are spaced from the front bearings of the bearing set 28 in axial direction. In this exemplary embodiment, the bearing set 28, 28' is formed as an anti-friction bearing, wherein other designs also are possible. In general, the bearings are conceivable in all positions on their horizontal axis.

In this exemplary embodiment, a tool holder is arranged inverted. A balancing element 18 is completely integrated in the spindle 16, wherein a hollow shank cone clamping cartridge 24 is inserted inverted, i.e. the hollow shank cone 22 is seated in the spindle 16 and the hollow shank cone receptacle in the tool holder (14, 24, 26). At its end adjoining the hollow shank cone clamping cartridge 24 the spindle 16 includes a hollow shank cone 22, so that the hollow shank cone clamping cartridge 24 can be accommodated in the hollow shank cone 22. Due to this formation, the hollow shank cone clamping cartridge 24 can manually be actuated axially and tensioned. An inverted automatic hollow shank cone clamping cartridge here is likewise conceivable and realizable.

Furthermore, there can also be used a short cone receptacle with screws, a cylindrical receptacle with screws or a steep cone receptacle.

The tool arrangement furthermore includes a clamping lid 26, which can be mounted on the tool mandrel 14 such that the grinding disk 20 serving as tool in this exemplary embodiment can be fixed in the receptacle provided in the tool mandrel 14. The clamping lid 26 is fixed with the tool mandrel 14 by means of screws. A fast and simple tool change thus can be realized by the change of the tool mandrel 14 including the clamped tool 20.

By the tool holder according to the invention a high rigidity is achieved for broader tools also without counter bearing. The bearing set 28, 28' just like the particular arrangement of the balancing element 18 in the interior of the spindle shaft 16 also contribute to a more compact construction and to a cost reduction as compared to conventional arrangements. A fast tool change can easily and comfortably be performed by tightening a single screw in the clamping cartridge.

Figure 3:
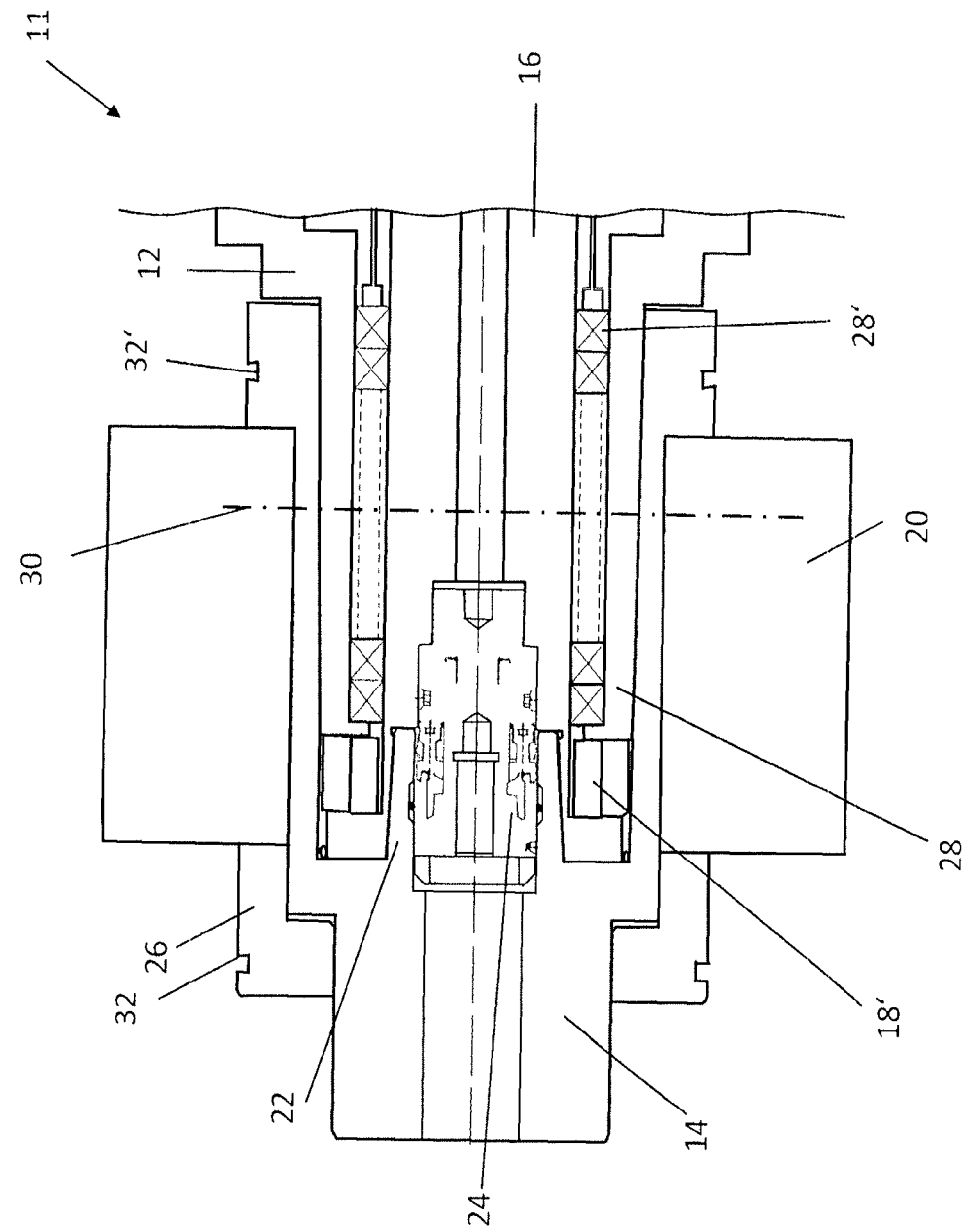
FIG. 3 shows a representation corresponding to FIG. 2 of another preferred exemplary embodiment.

In addition to an integrated balancing element, manual balancing rings 32, 32' can be provided, which can be arranged on both sides of the grinding disk 20. This is shown in the embodiments of FIGS. 2 and 3. In FIG. 3, however, the balancing ring 18' arranged on the circumference of the spindle 16 replaces the balancing element 18, which in FIG. 2 is integrated in the spindle. Moreover, there is also shown a configuration of the tool mandrel 14 which differs from that of FIG. 2. More details in this respect can be taken directly from FIG. 3.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A tool arrangement for a rotary machining tool, comprising:
a spindle,
a bearing set by which the spindle is rotatably accommodated in a housing, and
a tool holder, including a tool mandrel, clampable onto the spindle for fixing the tool, wherein the tool holder with the tool is clampable onto the spindle such that at least one front bearing of the bearing set and a set center of the bearing set are enclosed by at least one of the tool mandrel and the tool.

2. The tool arrangement according to claim 1, wherein the spindle is mounted in the housing with said bearing set, and the bearing set includes at least one bearing pair.

3. The tool arrangement according to claim 2, wherein the at least one bearing pair includes single-row spindle bearings.

4. The tool arrangement according to claim 2, wherein the at least one bearing pair includes magnetic bearings, hydrodynamic bearings, hydrostatic bearings, aerostatic bearings, or aerodynamic bearings.

5. The tool arrangement according to claim 2, wherein the tool holder includes the tool mandrel, a hollow shank cone clamping cartridge, and a clamping lid, and wherein the tool mandrel is formed such that it is releasably connectable with the spindle via the clamping cartridge and includes the tool holder.

6. The tool arrangement according to claim 5, wherein the clamping cartridge is either part of the tool holder and arranged between the spindle and the tool mandrel, or is part of the spindle.

7. The tool arrangement according to claim 5, wherein the spindle includes either a hollow shank cone or a hollow shank cone receptacle at its free end.

8. The tool arrangement according to claim 2, wherein a balancing element can be accommodated in the spindle, so that the balancing element is surrounded by the tool.

9. The tool arrangement according to claim 2, further comprising a balancing ring mounted on the spindle.

10. The tool arrangement according to claim 1, wherein the bearing set includes single-row spindle bearings.

11. The tool arrangement according to claim 10, wherein the tool holder includes the tool mandrel, a hollow shank cone clamping cartridge, and a clamping lid, and wherein the tool mandrel is formed such that it is releasably connectable with the spindle via the clamping cartridge and includes the tool holder.

12. The tool arrangement according to claim 1, wherein the bearing set includes magnetic bearings, hydrodynamic bearings, hydrostatic bearings, aerostatic bearings, or aerodynamic bearings.

13. The tool arrangement according to claim 12, wherein the tool holder includes the tool mandrel, a hollow shank cone clamping cartridge, and a clamping lid, and wherein the tool mandrel is formed such that it is releasably connectable with the spindle via the clamping cartridge and includes the tool holder.

14. The tool arrangement according to claim 1, wherein the tool holder includes the tool mandrel, a hollow shank cone clamping cartridge, and a clamping lid, and wherein the tool mandrel is formed such that it is releasably connectable with the spindle via the clamping cartridge and includes the tool holder.

15. The tool arrangement according to claim 14, wherein the clamping cartridge is either part of the tool holder and arranged between the spindle and the tool mandrel, or is part of the spindle.

16. The tool arrangement according to claim 14, wherein the spindle includes either a hollow shank cone or a hollow shank cone receptacle at its free end.

17. The tool arrangement according to claim 1, wherein a balancing element can be accommodated in the spindle, so that the balancing element is surrounded by the tool.

18. The tool arrangement according to claim 1, further comprising a balancing ring mounted on the spindle.

19. The tool arrangement according to claim 1, wherein the rotary machining tool is a hard-fine gear grinding machine for gear grinding.

20. A generating and profile grinding machine center, including a tool arrangement, the tool arrangement comprising:
    a spindle,
    a bearing set by which the spindle is rotatably accommodated in a housing, and
    a tool holder, including a tool mandrel, clampable onto the spindle for fixing the tool,
    wherein the tool holder with the tool is clampable onto the spindle such that at least one front bearing of the bearing set and a set center of the bearing set are enclosed by at least one of the tool mandrel and the tool.

* * * * *